(12) United States Patent
Gieseke et al.

(10) Patent No.: US 6,744,694 B1
(45) Date of Patent: Jun. 1, 2004

(54) GASEOUS CAVITY FOR FORWARD-LOOKING SONAR QUIETING

(75) Inventors: Thomas J. Gieseke, Newport, RI (US); Robert Kuklinski, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/679,676

(22) Filed: Oct. 6, 2003

(51) Int. Cl.[7] .................................................. H04K 3/00
(52) U.S. Cl. ............................................. 367/1; 367/901
(58) Field of Search ............................... 367/1, 87, 901, 367/153; 114/242, 253

(56) References Cited

U.S. PATENT DOCUMENTS

| | | |
|---|---|---|
| 3,041,992 A | 7/1962 | Lee |
| 3,915,106 A | 10/1975 | De Witt |
| 4,449,211 A | 5/1984 | Schmidt et al. |
| 5,008,863 A | 4/1991 | Archibald |
| 5,513,149 A * | 4/1996 | Salmi et al. .................... 367/1 |
| 5,524,568 A | 6/1996 | Bobst |
| 5,717,657 A * | 2/1998 | Ruffa .......................... 367/131 |
| 5,787,048 A * | 7/1998 | Sanford ........................ 367/1 |
| 6,167,829 B1 | 1/2001 | Lang |
| 6,567,341 B2 * | 5/2003 | Dreyer et al. .................. 367/1 |

* cited by examiner

*Primary Examiner*—Ian J. Lobo
(74) *Attorney, Agent, or Firm*—James M. Kasischke; Michael P. Stanley; Michael F. Oglo

(57) ABSTRACT

A sonar quieting system for a forward-looking sonar array is provided. The sonar quieting system includes a cavitator for forming an envelope, a strut for supporting the cavitator to a marine platform, such as a ship, a forward-looking sonar array mounted to a forward face of the cavitator, and a ventilation system for pumping a gas, such as air, into the envelope to create a gas cavity which envelops the supporting strut and equipment downstream of and during a forward movement of the cavitator.

18 Claims, 1 Drawing Sheet

GASEOUS CAVITY FOR FORWARD-LOOKING SONAR QUIETING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a sonar quieting system which utilizes a gaseous cavity to reduce hydrodynamic noise associated with turbulent boundary layers and turbulent wakes of high speed operations.

(2) Description of the Prior Art

It is a requirement of some current naval operations to operate high frequency mine-hunting sonar systems towed from high speed surface craft. These craft can operate at speeds exceeding 30 knots but the craft produce bubbly wakes (high frequency noise source) and generate high propulsion noise. Sonar systems towed in the wake of high speed surface craft are thus adversely affected by the generation of background noise by the craft. As such, the sonar systems are limited in their effective detection range.

A similar problem exists for future fast transport ships. Some concepts have been proposed in which the transport ships can operate at speeds up to and exceeding 100 knots. However, the ability of the ships to maneuver at their design speeds is limited. Consequently, the ability to detect obstacles at significant ranges thereby increases the ability of the ships to avoid collisions with marine mammals, mines, and assorted debris.

Sonar systems towed at very high speeds are affected by noise sources which may be controllable. In a first example, the turbulent flow of water over the streamlined firing of a sonar array generates pressure fluctuations on the firing. Both turbulent boundary layers and turbulent wakes contribute to this type of structural excitation of the sonar array. The pressure fluctuations can be experienced directly on the sonar array when the flow over the array is turbulent, or indirectly as the pressure fluctuations away from the sensor face are transmitted through the structure. In another example, cavitation bubbles and collapsing vapor bubbles can also produce large structural excitations.

A preferred method of control is to maintain laminar flow over the array face which minimizes hydrodynamic noise and acts to physically isolate the array face from portions of the structure experiencing large pressure fluctuations.

The propulsion system of the vessel or craft is a large producer of noise. Blade tonals, cavitation bubbles, and entrained air all produce noise which can propagate through the moving marine environment to the sonar array. Similarly, breaking bow-waves, hull slapping, ship machinery noise, and other ship related noise sources can reach the array through the marine environment. Isolating the array from these sources by significantly reducing or eliminating the direct acoustic path between the source and the array would greatly improve the array performance.

As a result, there is a need to isolate a forward-looking sonar array from own-ship and wake noise and to minimize hydrodynamic noise resulting from turbulent surface pressure fluctuations.

SUMMARY OF THE INVENTION

Accordingly, it is a general purpose and primary object of the present invention to provide a sonar quieting system which isolates a forward-looking sonar array from the propulsion noises of a tow ship or craft.

It is a further object of the present invention to provide a sonar quieting system which minimizes hydrodynamic noise resulting from turbulent surface pressure fluctuations.

To obtain the objects described, there is provided a sonar quieting system comprising a cavitator for forming an envelope of gas, means for supporting the cavitator to a marine platform, a forward-looking sonar array mounted to a forward face of the cavitator, and means for pumping a gas into the envelope to create a gas cavity capable of enveloping the supporting means and equipment downstream of the cavitator.

Another aspect of the present invention is a method for reducing hydrodynamic noise associated with turbulent boundary layers and turbulent wakes thereby enabling high speed operation of the forward-looking sonar array. The method comprises the steps of moving the marine vessel through water at a speed sufficient for the cavitator to create an envelope of gas, and injecting a fluid into a region aft of the cavitator to create a vapor shield between the sonar elements and any acoustic sources aft of the sonar elements.

Other details of the sonar quieting system, as well as other objects and advantages attendant thereto, are set forth in the following detailed description and the accompanying drawings wherein like reference numerals depict like elements.

DESCRIPTION OF THE PREFERRED EMBODIMENT(S)

Figure 1:
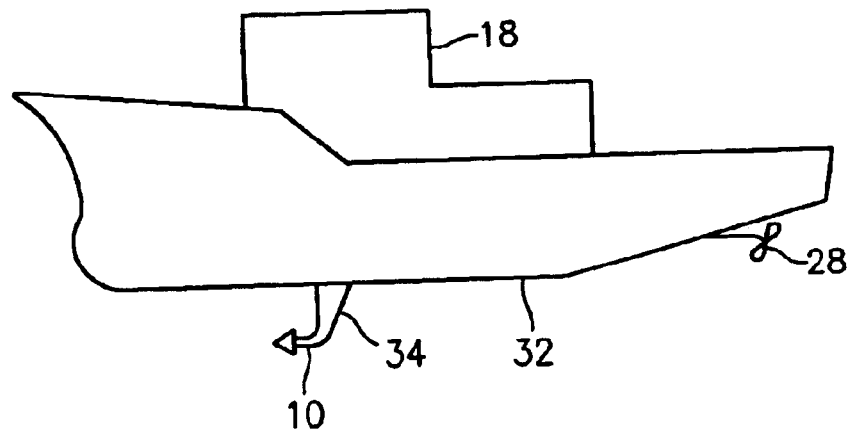
FIG. 1 is a profile of a ship having the sonar quieting system of the present invention.

In general, the sonar quieting system 10 of the present invention utilizes an envelope 12 formed in the wake of a cavitator 14 instrumented with a forward-looking sonar array 16. FIG. 1 illustrates the sonar quieting system 10 of the present invention positioned on a typical high-speed ship 18.

Figure 2:
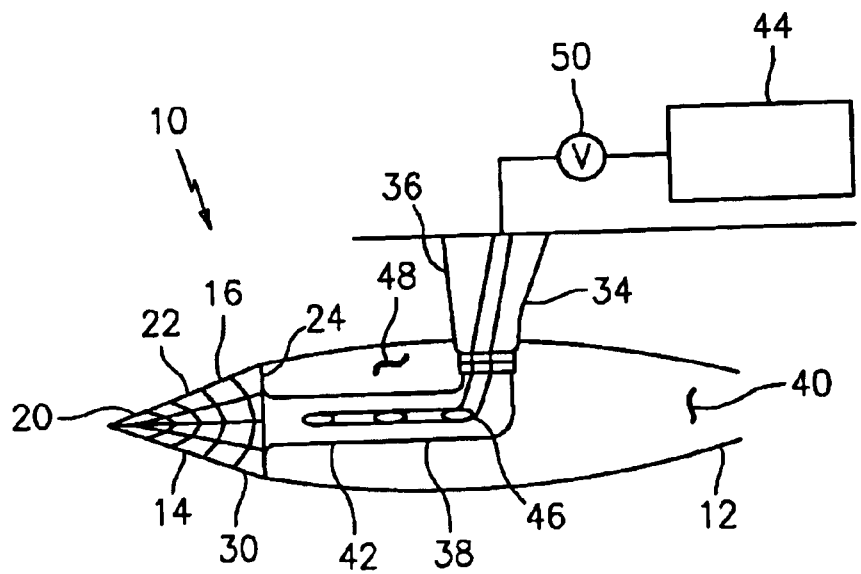
FIG. 2 is a cross-sectional view of the sonar quieting system of the present invention.

As shown in detail in FIG. 2, the sonar array 16 is positioned on a front face 20 of the cavitator 14. While shown as a cone, the cavitator 14 may have any operational shape including, but not limited to, that of a flat plate, disk, cone, and hemisphere.

By its design, the sonar array 16 maintains laminar flow over a face 22 of the sonar array until the flow separates at a base 24 of the cavitator 14. Air is forced into an envelope just aft of the base 24 to create a gaseous cavity or bubble. The cavity envelops a supporting structure for the sonar quieting system 10 and all equipment downstream of the cavitator 14, such as the propulsor 28 (see FIG. 1). By maintaining a laminar flow over the sonar array 16 and reducing turbulent boundary layers and generated wakes, the hydrodynamic excitation is significantly reduced and can be eliminated. A baffling effect is also realized by creating a vapor shield between the sonar array 16 and any acoustic sources aft of the array such as the propulsor 28.

The operation of the sonar quieting system 10 relies upon the ship moving at a speed to enable the cavitator 14 to generate the envelope 12. The cavitator 14 generates the envelope 12 in the form of a gas bubble in the wake of the sonar array 16. The cavitator 14 can be a flat plate placed normal to the flow, a cone shaped device, a disk shaped device, a hemispherically shaped device or any device with a streamlined shape. Alternatively, the cavitator 14 can be asymmetric or sectionalized (like a hydrofoil), based on the needs of the sonar system 10 or the ship 18.

The sonar array 16 is embedded into the forward face 22 of the cavitator 14. For a laminar flow, the sonar array 16 typically includes a plurality of sonar array elements 30. The sonar array elements 30 are present in a sufficient number to enable the creation of forward-looking acoustic beams. The sonar array elements 30 may be any suitable sonar array elements known to those skilled in the art.

The cavitator 14 is attached to a hull 32 of the ship 18 by a support strut 34. The support strut 34 is preferably formed with a first arm 36 extending downwardly from the hull 32 and a second arm 38 extending at a right angle to the first arm. The support strut 34 with its arms 36 and 38 is preferably streamlined to minimize drag and noise production. As will be discussed hereinafter, the shielding effects of a produced gas cavity 40 and mechanical isolation reduce the impact of noise generated by the support strut. The support strut 34 contains ventilation ducting 42 and signal and power connectors (not shown) to the sonar array 16.

The support strut 34 may be extendable to increase the stand-off between the sonar array 16 and the hull 32 and to enable retraction of the sonar quieting system 10 into the host marine platform, such as the ship 18. Any suitable means known to those skilled in the art may be used to retract or extend the support strut 34.

To enable formation of the suitably sized gaseous cavity 40, a fluid, such as air, from a source 44 is pumped through the support strut 34 via the ventilation ducting 42 and openings 46 to an area 48 just aft of the base 24 of the cavitator 14. A valve 50 is provided to control the ventilation rate to the ducting 42.

The injection rate of a fluid, such as air, through the openings 46 determines the size of the gaseous cavity 40 for a given cavitator 14. Significant ventilation rates may be injected to generate large gaseous cavities 40 at modest ship speeds. The gaseous cavity 40 preferably is inflated via the ventilation ducting 42 and the openings 46 to envelope the entire second arm 38 of the support strut 34.

The gaseous cavity 40 reduces and can eliminate contact of turbulent flow with the structure containing the sonar array 16. The gaseous cavity 40 thus intersects the support strut 34; however, the contact location is mechanically isolated from the sonar array 16.

With the gaseous cavity 40 thus created and mechanical isolation incorporated, the direct paths between the ship noise sources and the forward-looking sonar array 16 are reduced, especially with sources aft of the sonar array. The noise produced by the gaseous cavity 40 and the cavitator 14 is minimal because the flow separating on the cavitator is laminar (with no fluctuating edge forces) with the gaseous cavity preferably closing with large air bubbles.

The sonar quieting system 10 of the present invention minimizes the effects of hydrodynamically excited noise and reduces the acoustic and structural path between significant ship noise sources such as the propulsor 28. This reduction enables high speed ship operations with low array noise.

While one system for forming the gaseous cavity 40 has been shown, the gaseous cavity could also be created using a variety of asymmetric and sectionalized cavitators.

Furthermore, the support strut 34 can be a supercavitating strut with the effect of minimizing turbulent excitation of the strut structure.

It is apparent that there has been provided in accordance with the present invention a gaseous cavity for forward-looking sonar quieting which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A system for quieting an area where sonar is to be employed, said system comprising:
   a cavitator capable of deflecting oncoming fluid such that an envelope is created in a wake of said cavitator;
   a sonar array mounted on a face of said cavitator; and
   a gas source for supplying gas to the envelope such that the supplied gas creates a cavity of gas within the envelope;
   whereby the formed gas cavity reduces turbulent flow of the fluid in the area where sonar is to be employed and thus quieting the area.

2. The system in accordance with claim 1, said system further comprising a strut for supporting said cavitator to a mobile marine platform.

3. The system in accordance with claim 2, wherein the strut encompasses a plurality of openings in fluid communication with said gas source.

4. The system in accordance with claim 3 further comprising a valve for controlling the supplied gas from said gas source.

5. The system in accordance with claim 4, wherein said sonar array comprises a plurality of sonar array elements embedded in said face.

6. The system in accordance with claim 5, wherein said sonar array is a forward-looking type thereby allowing an operation of said sonar array to be substantially isolated from the turbulent flow of the fluid.

7. The system in accordance with claim 6, wherein said cavitator is a plate normal to said strut.

8. The system in accordance with claim 6, wherein said cavitator is selected from a group of a disk, cone or hemispherical shape.

9. The system in accordance with claim 1 further comprising a valve for controlling the supplied gas from said gas source.

10. The system in accordance with claim 9, wherein said sonar array comprises a plurality of sonar array elements embedded in said face.

11. The system in accordance with claim 10, wherein said sonar array is a forward-looking type thereby allowing an operation of said sonar array to be substantially isolated from the turbulent flow of the fluid.

12. The system in accordance with claim 11, wherein said cavitator is a plate positioned normal to the oncoming fluid.

13. The system in accordance with claim 11, wherein said cavitator is selected from a group of a disk, cone or hemispherical shape.

14. The system in accordance with claim 3, wherein said strut is extendable.

15. The system in accordance with claim 14 further comprising a valve for controlling the supplied gas from said gas source.

16. The system in accordance with claim 15, wherein said sonar array comprises a plurality of sonar array elements embedded in said face.

17. The system in accordance with claim 16, wherein said sonar array is a forward-looking type thereby allowing an operation of said sonar array to be substantially isolated from the turbulent flow of the fluid.

18. A method for reducing hydrodynamic noise associated with high speed movement of a sonar array in a marine environment, said method comprising the steps of:

providing a cavitator with the sonar array mounted on the face thereof;

moving said cavitator through the marine environment at a speed sufficient for said cavitator to create an envelope in a wake of said cavitator; and injecting a gas to the envelope to create a gas cavity between the sonar array and any acoustic sources aft of the sonar array such that the hydrodynamic noise associated with the high speed movement is reduced.

* * * * *